Patented Sept. 4, 1962

3,052,698
ESTER PRODUCTION
Bernard S. Friedman, Chicago, and Sherwood M. Cotton, Harvey, Ill., assignors, by mesne assignments, to Sinclair Research, Inc., New York, N.Y., a corporation of Delaware
No Drawing. Filed Oct. 27, 1958, Ser. No. 769,539
5 Claims. (Cl. 260—410.9)

This invention relates to the synthesis of esters from an olefin hydrocarbon, an alcohol and carbon monoxide by reaction in the presence of hydrogen fluoride. The esters are useful, for example, as thickeners for lubricants and as intermediates for the production of polyester resins. In performing the process of the invention, stoichiometric amounts of olefin, alcohol and carbon monoxide can be used; for example, when a monoester is to be made, approximately equimolar amounts of the olefin, monohydric alcohol and carbon monoxide can be reacted while in contact with hydrogen fluoride. The esters are of the type RCOOR' where the R group is derived from the olefin and the R' group is derived from the alcohol. Polyhydric as well as monohydric alcohols can be employed and in this case diesters may be manufactured by substituting for one mole of monohydric alcohol half a mole of a glycol, one third mole of a triol, etc. and mixed esters may be obtained with these or other proportions.

The olefin can be an aliphatic straight or branched chain monoolefin such as propylene, isobutylene, and polymers of these materials. Cyclic aliphatic olefins also may be used. In general, the olefin can be of any length desired and frequently contains three or more carbon atoms, with 20 carbon atoms being the preferred upper limit. The hydrocarbon structure of the acyl group of the ester is derived from the starting olefin.

The alcohol whether mono- or polyhydric may be primary or secondary, aliphatic including cycloaliphatic, and of any desired length. Tertiary alcohols are to be avoided as they are easily dehydrated in the process. Methanol, ethanol, isopropanol and other short chain, non-tertiary lower aliphatic alcohols are preferred from the standpoint of economy and volatility when the esters are to be used as intermediates in the preparation of complex esters, etc. Highly useful esters are made by reacting alcohols of up to about 20 carbon atoms.

Alcohols boiling in the neighborhood of about 100° C. or below, when present in the reaction product in excess, aid in the recovery of the hydrogen fluoride when the reaction product is fractionated, while longer chain alcohols such as 2-ethyl hexanol may be used to produce satisfactory ester synthetic lubricants and lubricant thickeners. Oxo alcohols and those derived by hydrogenating fatty acids such as lauric and stearic acids are also suitable for use in this process. Polyols, such as ethylene glycol, propylene glycol, etc., ordinarily give a reaction product containing a mixture of mono- and diesters.

Hydrogen fluoride is used in a quantity of at least about two moles per mole of alcohol. Twenty moles of hydrogen fluoride seems to be the practical upper limit based on economic reasons. Substantially pure hydrogen fluoride may be used, but in the commercial practice of this invention it may be fed to the reaction mixed with some alcohol. About 4 to 10 moles of hydrogen fluoride per mole of alcohol is preferred. The presence of water can be undesirable, since it deactivates the hydrogen fluoride and decreases the yield of ester and leads to contamination of the product with organic acids.

A preferred reaction procedure comprises mixing the olefin and alcohol and gradually charging this mixture to a stirred pressure vessel containing the hydrogen fluoride and CO at a pressure sufficient to maintain the organic materials in the liquid phase. The CO partial pressure is preferably above about 100 p.s.i.g. The hydrogen fluoride and olefin should not be brought into contact except in the presence of the carbon monoxide, unless it is desired to polymerize the olefin prior to the carbon monoxide reaction. The reaction mixture is then stirred, or the vessel is shaken, until pressure readings indicate that the carbon monoxide pressure within the vessel has stopped falling. A slight excess of alcohol may be provided to insure conversion of all the olefin to the ester without undesired side reactions.

The reaction with carbon monoxide is usually performed at a temperature of about 10 to 200° F. Room temperature is satisfactory, although a slightly higher temperature may be used to initiate the reaction, allowing the temperature to fall when the reaction is well underway.

Where the olefin is injected into a pressurized mixture of CO, hydrogen fluoride and the alcohol, the most advantageous temperature to be used depends upon the mole percentage of alcohol in the mixture, higher temperatures being required for higher percentages of alcohol. For example, where the hydrogen fluoride catalyst layer initially contains 25 mole percent alcohol a temperature of about 50 to 150° F., preferably about 70 to 110° F. is desired; where the hydrogen fluoride layer initially contains 10 mole percent alcohol a temperature of about 30 to 120° F., preferably about 45 to 100° F. is advisable. These conditions may also prevail when polyols are used. When the reaction is complete, the remaining CO is released and the liquid reaction product is discharged to fractionation. The hydrogen fluoride, probably containing some entrained alcohol, is vaporized and collected for recycle. Any olefin and any alcohol that remains unreacted is also recovered and may be recycled.

It is frequently desirable to give the reaction product a treatment with an alkali metal alcoholate to esterify any traces of acyl fluoride in the reaction product. These traces of fluoride are susceptible to decomposition in the subsequent distillation. For example, when a methyl ester is being prepared the product of the carbon monoxide reaction may be heated with a small amount, say 2% of $NaOCH_3$ at a temperature of about 100° to 175° F. Alternatively in this situation sodium methoxide may be fed directly to the distillation column with the ester.

The following examples are intended to be illustrative only and not limiting.

*Example I*

10.75 moles anhydrous hydrogen fluoride (215 grams) was injected into a 2-liter alloy pressure vessel equipped with an agitator, and the vessel pressured with carbon monoxide to 540 p.s.i.g. 3.22 moles isobutylene (180 grams) and 3.38 moles methanol (108 g.) were injected concurrently from separate blowcases into the reactor over a period of 71 minutes, after which the stirring was continued for an additional 64 minutes. CO was supplied to maintain the pressure at 480±60 p.s.i.g. The temperature was maintained at 80° F.±5° by means of a water bath.

The product of the reaction was discharged into a polyethylene bottle containing ice from which the gases passed through a water scrubber, cold trap (−80° C.) and wet test meter. No condensate was found in the cold trap. By weight difference it was estimated that 57 grams of CO was absorbed. The liquid product was washed with water, dried (wt. 310 grams) and examined by infrared; the product contained chiefly methyl pivalate and some methyl esters of $C_9$ and $C_{13}$ acids.

Example II

Isobutylene (180 g.) and dry isopropanol (203 g.) were charged concurrently from separate blowcases to CO at 86° F. and 475–335 p.s.i.g. in the presence of 220 g. of anhydrous hydrogen fluoride. The addition required 106 minutes, and final stirring, 9 minutes. CO was absorbed to the extent of 52 grams. The product was predominantly isopropyl isovalerate.

Example III

Diisobutylene (336 g.) is added at 85° F. to a stirred autoclave containing CO (580–365 p.s.i.g.), 215 g. hydrogen fluoride, and 106 g. of methanol. The addition is complete in 75 minutes, and the stirring continued for 40 minutes more. The weight of the liquid products collected at −80° C. indicates a CO uptake of 106 g. The reaction gives a good yield of methyl tetramethyl pentanoate. The liquid product is placed in a stainless steel flask connected to a cold (−80° C.) copper trap which is in turn connected to a water aspirator. The flask is heated on a water bath and under vacuum applied to distill the hydrogen fluoride and excess alcohol.

The remaining product is washed with cold water and the wash water analyzed by titration with alkali in the presence of methyl red indicator. Only 7.6 g. of hydrogen fluoride is found, indicating almost complete removal of the hydrogen fluoride from the organic liquid product. This product is then treated with sodium methoxide to convert small amounts of residual acyl fluoride to the methyl ester.

Example IV

Butene-1 (193 g.) is contacted with CO at 525–370 p.s.i.g. and 116° F. in the presence of 206 g. of anhydrous HF containing 121.5 g. of dry methanol. The amount of CO absorbed is 57.5 g. Distillation yields methyl ester of 2-methylbutyric acid, B.P. 116–120° C.; methyl ester of $C_9$ acids, B.P. 185–188° C.; and methyl esters of $C_{13}$ acids, B.P. 257–269° C., and methyl esters of higher acids.

We claim:

1. A method for the production of esters which comprises reacting a monoolefin, an aliphatic alcohol, and carbon monoxide in the presence of at least about two moles of hydrogen fluoride per mole of alcohol at a temperature of about 10 to 200° F. and a pressure sufficient to maintain the liquid phase.

2. The process of claim 1 where the hydrogen fluoride is present in an amount of about 4 to 10 moles per mole of alcohol.

3. The process of claim 1 where the alcohol is one which boils below about 100° C.

4. The process of claim 1 in which the olefin is one having 3 to 20 carbon atoms.

5. The process of claim 1 where the partial pressure of the carbon monoxide is above about 100 p.s.i.g.

References Cited in the file of this patent

UNITED STATES PATENTS

| | | |
|---|---|---|
| 1,979,717 | Vail | Nov. 6, 1934 |
| 2,414,999 | Bearse et al. | Jan. 28, 1947 |
| 2,542,767 | Gresham et al. | Feb. 20, 1951 |
| 2,771,478 | Reppe et al. | Nov. 20, 1956 |
| 2,945,871 | Murray | July 19, 1960 |